(31.)

B. W. TUTHILL.

Improvement in Hand Truck.

No. 4,700. Reissued Jan. 2, 1872.

*Witnesses:*
Geo Haynes
J. M. Coombs

Beckwith. W. Tuthill
per Munn, Coombs & Co
Attorneys

AM. PHOTO-LITHOGRAPHIC CO. N.Y. (OSBORNE'S PROCESS.)

UNITED STATES PATENT OFFICE.

BECKWITH W. TUTHILL, OF NEW YORK, N. Y.

IMPROVEMENT IN HAND-TRUCKS.

Specification forming part of Letters Patent No. 94,673, dated September 7, 1869; reissue No. 4,700, dated January 2, 1872.

Specification describing a new and useful Improvement in Hand-Trucks, and vehicles of a like kind, invented by BECKWITH W. TUTHILL, of the city, county, and State of New York, formerly of Oregon city, in the county of Clackamas and State of Oregon.

This invention consists in a novel construction of the frame-work of hand-trucks or wheelbarrows, and vehicles of a like kind, by means of metal tubes, preferably of gas-tubing, joined together in a cheap, simple, and inexpensive way, whereby said vehicles may be made light and readily taken apart for repairs.

The invention is here shown as applied to a hand-truck.

Figure 1:
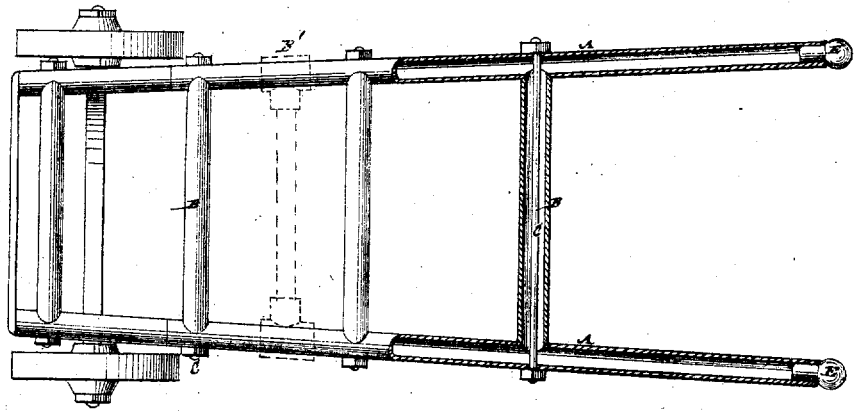
Figure 1:
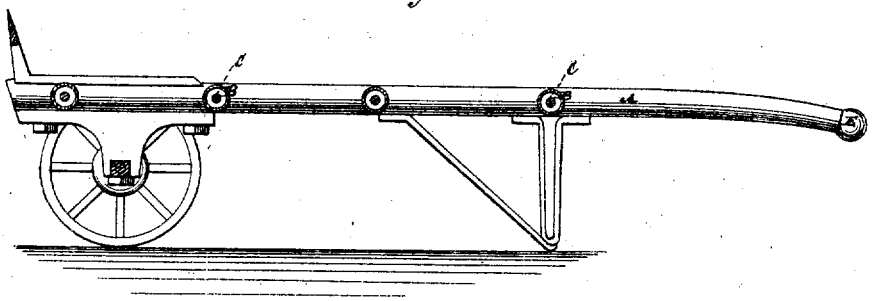

Figure 1 represents a partly-sectional plan of a truck constructed according to my improvement. Fig. 2 represents a longitudinal section of the same.

Similar letters of reference indicate corresponding parts.

I propose to make the side bars A and transverse bars B of the truck or vehicle of metal tubes, which may be either iron, brass, or steel, as preferred, joining the same by making the ends of the transverse bars B concave to fit the curvature of the side bars, and passing rods C through holes in the side bars and through the bore of the transverse bars, and then screwing them up by nuts at the ends; or, by another plan or modification, I propose to make the side bars in sections, and join them at the junction of the transverse bars by T-pieces, such as are commonly used in joining gas-pipes, as represented at B′ by dotted lines in Fig. 1. The ends of the side bars forming the handles may be covered with leather or other substance which will not hurt the hands, and wood knobs E may be inserted in the ends to prevent the hands from slipping off. In this way hand-trucks or wheelbarrows may be made cheaper than when made of wood in the common way, and the same may be readily taken apart for repairs.

Having thus described my invention, what I claim as new, and desire to secure by Letters Patent, is—

The construction of the frame-work of hand-trucks, and vehicles of a like kind, of metallic tubes A B, substantially as herein described.

BECKWITH W. TUTHILL.

Witnesses:

FRED. HAYNES,

FERD. TUSCH.

(31)